US008696329B2

(12) United States Patent
Busch et al.

(10) Patent No.: US 8,696,329 B2
(45) Date of Patent: Apr. 15, 2014

(54) OSCILLATING DIAPHRAGM FAN HAVING COUPLED SUBUNITS AND A HOUSING HAVING AN OSCILLATING DIAPHRAGM FAN OF THIS TYPE

(75) Inventors: Klaus Busch, Amberg (DE); Christian Scharf, Ebermannsdorf (DE); Christoph Wiesner, Amberg (DE)

(73) Assignee: Siemens AG, Munich (DE)

( * ) Notice: Subject to any disclaimer, the term of this patent is extended or adjusted under 35 U.S.C. 154(b) by 1160 days.

(21) Appl. No.: 12/635,325

(22) Filed: Dec. 10, 2009

(65) Prior Publication Data
US 2010/0150753 A1 Jun. 17, 2010

(30) Foreign Application Priority Data

Dec. 15, 2008 (EP) ..................... 08171649

(51) Int. Cl.
F04B 43/02 (2006.01)
F04B 17/00 (2006.01)
F24F 7/06 (2006.01)

(52) U.S. Cl.
USPC ...................... 417/413.1; 417/413.2; 454/341

(58) Field of Classification Search
USPC ........ 454/341, 184; 417/413.2; 361/678, 690; 239/102.1, 102.2
See application file for complete search history.

(56) References Cited

U.S. PATENT DOCUMENTS

| 4,859,152 | A | * | 8/1989 | Kimura et al. .................. 417/63 |
| 5,085,562 | A | * | 2/1992 | van Lintel .................. 417/413.3 |
| 5,529,465 | A | * | 6/1996 | Zengerle et al. ............ 417/413.2 |
| 5,690,165 | A | * | 11/1997 | Roth et al. ........................ 165/54 |
| 5,798,600 | A | * | 8/1998 | Sager et al. ..................... 310/330 |
| 6,033,191 | A | * | 3/2000 | Kamper et al. ................. 417/322 |
| 6,056,204 | A | * | 5/2000 | Glezer et al. ......................... 239/8 |
| 6,123,145 | A | * | 9/2000 | Glezer et al. ............. 165/104.33 |
| 6,457,654 | B1 | * | 10/2002 | Glezer et al. ....................... 239/4 |
| 6,588,497 | B1 | | 7/2003 | Glezer et al. |
| 6,691,977 | B2 | * | 2/2004 | Knebel et al. .................... 251/11 |
| 6,729,856 | B2 | * | 5/2004 | Cabuz et al. ................... 417/322 |
| 6,759,159 | B1 | * | 7/2004 | Gray et al. ....................... 429/71 |
| 6,824,915 | B1 | * | 11/2004 | Pedicini ........................... 429/72 |
| 6,848,631 | B2 | * | 2/2005 | Monson et al. ............ 239/102.1 |
| 7,048,519 | B2 | * | 5/2006 | Fong et al. .................. 417/413.2 |
| 7,251,139 | B2 | * | 7/2007 | Bhattacharya et al. ........ 361/719 |
| 7,252,140 | B2 | * | 8/2007 | Glezer et al. ................. 165/80.3 |
| 7,319,587 | B2 | * | 1/2008 | Tomioka .................. 361/679.48 |
| 7,517,201 | B2 | * | 4/2009 | Cabuz et al. ............... 417/413.2 |
| 7,768,779 | B2 | * | 8/2010 | Heffington et al. ........... 361/694 |
| 7,891,410 | B1 | * | 2/2011 | Monson et al. .............. 165/80.2 |
| 7,944,697 | B2 | * | 5/2011 | Hata et al. ...................... 361/704 |

(Continued)

FOREIGN PATENT DOCUMENTS

| EP | 1 523 038 | 4/2005 |
| EP | 1 722 412 | 11/2008 |
| WO | WO 2006/114934 | 11/2006 |
| WO | WO 2007/103384 | 9/2007 |

*Primary Examiner* — Steven B McAllister
*Assistant Examiner* — Frances H Kamps
(74) *Attorney, Agent, or Firm* — Cozen O'Connor

(57) ABSTRACT

An oscillating diaphragm fan having a plurality of subunits which each have an oscillating diaphragm that is excited by a magnetic system in an actuator chamber, wherein the air pulsation generated by oscillating diaphragm is discharged outwardly, the actuator chambers of the subunits are connected via means for compensating pressure and are encapsulated outwardly, and the magnetic systems of the subunits are excited out of phase with each other.

5 Claims, 1 Drawing Sheet

(56) References Cited

U.S. PATENT DOCUMENTS

| | | | |
|---|---|---|---|
| 7,972,124 B2 * | 7/2011 | Hirata et al. | 417/413.2 |
| 7,990,705 B2 * | 8/2011 | Bult et al. | 361/694 |
| 8,035,966 B2 * | 10/2011 | Reichenbach et al. | 361/694 |
| 8,051,905 B2 * | 11/2011 | Arik et al. | 165/287 |
| 8,083,157 B2 * | 12/2011 | Arik et al. | 239/102.2 |
| 8,297,947 B2 * | 10/2012 | Van Rensburg et al. | 417/413.2 |
| 8,308,452 B2 * | 11/2012 | Amirouche et al. | 417/413.2 |
| 8,382,453 B2 * | 2/2013 | Tomita et al. | 417/413.2 |
| 2003/0162071 A1 * | 8/2003 | Yasuda | 429/34 |
| 2006/0196638 A1 * | 9/2006 | Glezer et al. | 165/80.3 |
| 2007/0181709 A1 * | 8/2007 | Lee | 239/135 |
| 2007/0290068 A1 * | 12/2007 | Lu | 239/102.2 |
| 2008/0009187 A1 * | 1/2008 | Grimm et al. | 439/595 |
| 2008/0196720 A1 * | 8/2008 | Kollmeyer et al. | 128/204.21 |
| 2008/0197208 A1 * | 8/2008 | Taya et al. | 239/4 |
| 2009/0084866 A1 * | 4/2009 | Grimm et al. | 239/4 |
| 2009/0148320 A1 | 6/2009 | Lucas | |
| 2009/0214358 A1 * | 8/2009 | O'Neill | 417/53 |
| 2010/0296248 A1 * | 11/2010 | Campbell et al. | 361/699 |
| 2011/0168361 A1 * | 7/2011 | Chao et al. | 165/121 |
| 2011/0186132 A1 * | 8/2011 | Clingman et al. | 137/1 |
| 2011/0256004 A1 * | 10/2011 | Vogeley et al. | 417/413.2 |
| 2012/0145361 A1 * | 6/2012 | Glezer et al. | 165/109.1 |
| 2012/0171062 A1 * | 7/2012 | Kodama et al. | 417/413.2 |
| 2012/0301333 A1 * | 11/2012 | Smirnov | 417/413.2 |

* cited by examiner

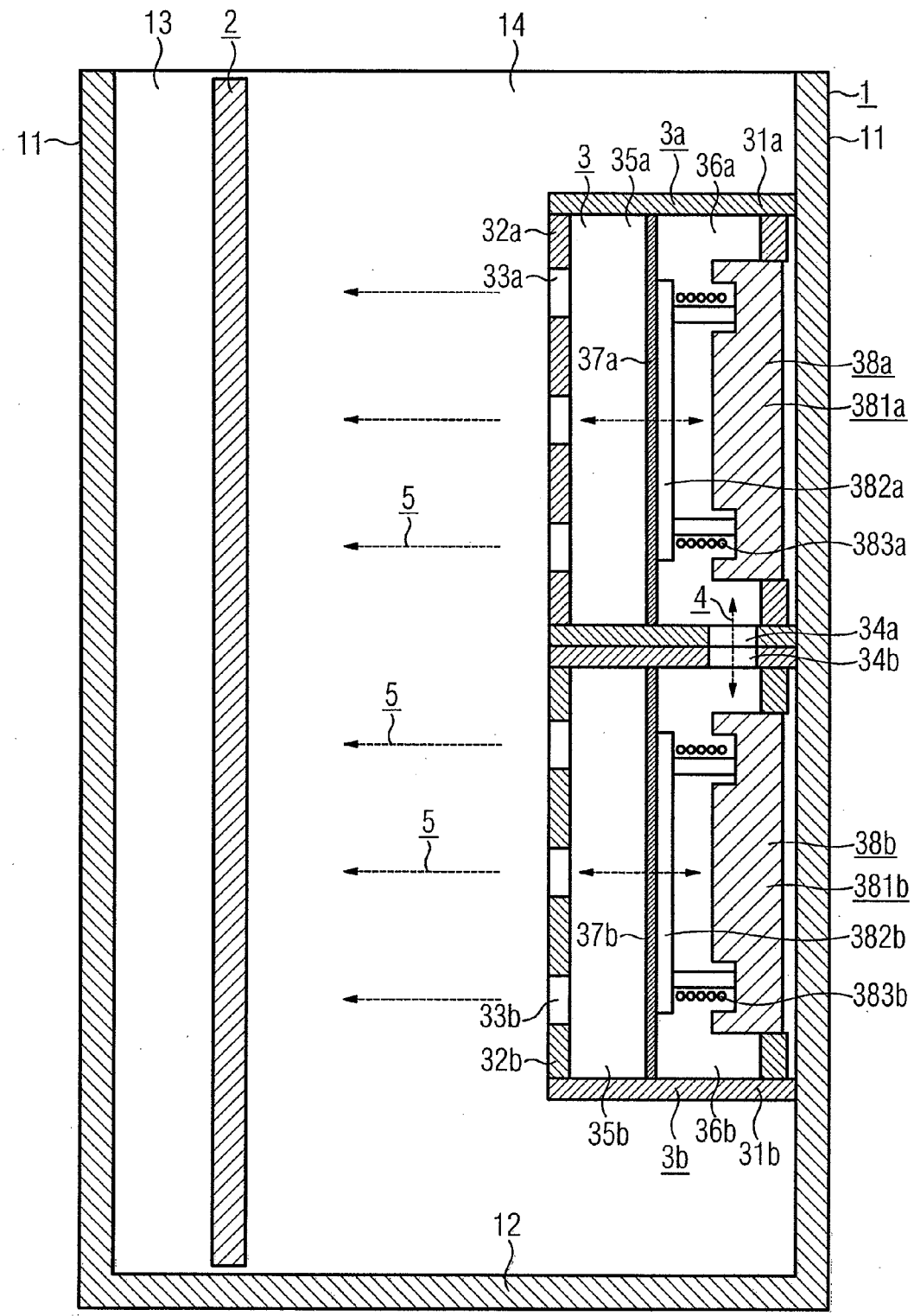

OSCILLATING DIAPHRAGM FAN HAVING COUPLED SUBUNITS AND A HOUSING HAVING AN OSCILLATING DIAPHRAGM FAN OF THIS TYPE

BACKGROUND OF THE INVENTION

1. Field of the Invention

The present invention relates to oscillating diaphragm fans and, more particularly, to an oscillating diaphragm fan having coupled subunits and a housing having the oscillating diaphragm fan.

2. Description of the Related Art

Fans with moving parts are known. In such fans, it is known to mount the movable parts such that they are free of friction and do not contact each another. The set-up of these fans is in some way comparable to the operation of a loudspeaker. Fans of this type are known as "jet cooler" or "jet generator" fans, and are designated below as oscillating diaphragm fans.

Oscillating diaphragm fans include an oscillating diaphragm which is held in a housing and which is excited by a magnetic system located in an actuator chamber. The air pulsation generated by the oscillating diaphragm is discharged outwardly. If, for example, the oscillating diaphragm fan is placed inside an electronic housing, it causes air turbulences therein. As a result, the heat loss generated, for example, by electronic components and processors can be swirled and led away from the heat sources. Furthermore, the air turbulence caused by the fan also facilitates removal of heat from "hot spots" on circuit boards and assists natural convection inside an electronic housing in a directed manner.

Typically, fans constructed in this manner do not experience any friction-induced wear due to the contactless magnetic drive of the oscillating diaphragm. Generally, however, dust deposits may impede the freedom of movement of the elements of the magnetic drive and may, therefore, limit the service life of the fan. If, for example, such a magnetic drive comprises a magnetic disk with an annular groove, into which an annular carrier connected to the oscillating diaphragm and having a coil winding penetrates, the annular groove may gradually become blocked. As a result, the ability of the annular carrier to oscillate and consequently the ventilation action may become restricted.

SUMMARY OF THE INVENTION

It is therefore an object of the invention to provide an oscillating diaphragm fan in which the operational restrictions of the function of the fan due to gradual contamination can be avoided and to allow an especially advantageous structural integration of an oscillating diaphragm fan of this type into a housing.

These and other objects and advantages are achieved by an oscillating diaphragm fan having a plurality of subunits, each of which has an oscillating diaphragm, where each oscillating diaphragm is excited via a magnetic system in an actuator chamber. The air pulsations generated by the subunits are discharged outwardly in a known manner. In accordance with the invention, the actuator chambers of the subunits are each encapsulated outwardly and are connected to one another via means for pressure compensation. Furthermore, the magnetic systems of the subunits are excited out of phase with each other.

The oscillating diaphragm fan in accordance with the invention advantageously provides air-coupled actuator chambers of the subunits that are completely encapsulated outwardly. Consequently, no air exchange with the surroundings is necessary for pressure compensation, regardless of the oscillations of the magnetic systems located therein. As a result, dirt cannot be sucked in from the surroundings and thereby deposited in the magnetic systems located in the actuator chambers. Due to the excitation, which is phase-shifted in accordance with the invention, of the magnetic systems and of the oscillating diaphragms connected thereto, a compensation of under-pressures or over-pressures in the system of the air-coupled actuator chambers is continually ensured via the pressure compensation means.

In an embodiment, the oscillating diaphragm fan is configured as a double system of two coupled subunits. As a result, the magnetic systems of the subunits are advantageously activated in opposition, i.e., with a phase shift of substantially 180°. The oscillating diaphragms of the subunits therefore oscillate oppositely to each other. Hence, while the oscillating diaphragm of one subunit is pressed outward by the associated magnetic system and consequently causes an under-pressure in the respective actuator chamber, the oscillating diaphragm of the other subunit is simultaneously pulled inwardly by the associated magnetic system and, consequently, an overpressure is created in the respective actuator chamber. In accordance with this embodiment, the means for compensating pressure between the actuator chambers ensures compensation of under-pressures and over-pressures in the overall system.

In an embodiment, the means for compensating pressure comprises a pressure compensation duct. In an embodiment in which the subunits have separate sub-housings, the pressure compensation duct may comprise mutually contiguous orifices located in the side walls of the sub-housings. In another embodiment, the means for compensating pressure comprises a diaphragm that is placed between the actuator chambers of the sub-housings. In a still further embodiment, the actuator chambers of the subunits may also be coupled to one another via separate pressure compensation lines.

It should be understood that an oscillating diaphragm fan in accordance with the contemplated embodiments may also have more than two subunits which are excited with a corresponding phase shift. In a particular advantageous embodiment, an even number of subunits is provided. Here, the subunits may be divided into two groups, the magnetic systems of which, in turn, are activated oppositely to each other.

It should be appreciated that an increase in the number of subunits may cause an increase in the ventilation power of the oscillating diaphragm fan according to the contemplated embodiments. If, moreover, the actuator chambers in the sub-housings of the subunits are connected to one another, for example, via pressure compensation lines, the individual sub-housings may, for example, also be arranged and distributed inside an electronic housing. As a result, the oscillating diaphragm fan in accordance with the contemplated embodiments constitutes a network of pressure-coupled subunits excited out of phase with each other.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The foregoing and other advantages and features of the invention will become more apparent from the detailed

DETAILED DESCRIPTION OF THE PREFERRED EMBODIMENTS

The FIGURE shows an exemplary sectional view of a housing 1, such as an electronic housing, which includes, for example, a bottom 12 and two vertical side walls 11 that are disposed opposite to one another. A ventilation orifice 14 extending in the drawing plane is located, for example, on the top-side 13 of the housing 1. As a result, it is possible for air to naturally exchange with the surroundings and vent due to convection. However, dirt particles may also pass via this ventilation orifice 14 into the inside of the housing 1 and be deposited therein.

In an embodiment, the housing 1 may contain a multiplicity of electrical elements which generate thermal heat loss, and from which heat therefore has to be removed. A vertically installed electronic circuit board 2 is illustrated symbolically in the FIGURE as an exemplary installation part of this type. An oscillating diaphragm fan 3 constructed in accordance with the exemplary embodiment is placed on the inside of the opposite right vertical sidewall to remove heat from the electronic circuit board 2. The oscillating diaphragm fan 3 includes, for example, a combination unit consisting of two subunits 3a, 3b.

In accordance with an advantageous embodiment, each subunit 3a, 3b of the oscillating diaphragm fan 3 has an independent sub-housing 31a, 31b. Each sub-housing 31a, 31b is divided by an oscillating diaphragm 37a, 37b into a nozzle chamber and an actuator chamber 35a, 35b and 36a, 36b, respectively. The air pulsations 5 generated by the oscillating diaphragms are discharged into the inner space of the housing 1 via the assigned nozzle chamber 35a, 35b. Here, the top-side 32a, 32b of each sub-housing 31a, 31b is advantageously provided with nozzle orifices 33a, 33b for discharging the air pulsations 5 generated by the oscillating diaphragms.

Each respective oscillating diaphragm 37a, 37b is excited by a magnetic system 38a, 38b which is accommodated in the actuator chamber 36a, 36b of the corresponding sub-housing 31a, 31b. In accordance with the contemplated embodiments, the actuator chambers 36a, 36b of the subunits 3a, 3b are encapsulated outwardly, and are interconnected by means for compensating pressure 34a, 34b. The magnetic systems 38a, 38b of the subunits 3a, 3b are excited in a phase shifted manner as described above. In the contemplated embodiment shown in the FIGURE, the means for compensating pressure comprise pressure compensation ducts 34a, 34b that are merged into the side walls of the sub-housings 31a, 31b. The pressure compensation ducts 34a, 34b conduct a compensation flow 4 during phase shifted excitation of the magnetic systems 38a, 38b to ensure compensation of under- and over-pressures.

The magnetic systems 38a, 38b of the exemplary embodiment shown in the FIGURE each include a disk-shaped magnetic disk 381a, 381b having an annular groove, into which an annular coil former 382a, 382b penetrates in a contactless manner. Here, the annular coil former 382a, 382b is fitted with, for example, a cylindrical coil winding 383a, 383b that is excited by an alternating voltage of adjustable frequency and phase position. The oscillating diaphragms 37a, 37b are connected to the coil former 382a, 382b of the respective magnetic system 38a, 38b on a side facing the respective actuator chamber 36a, 36b such that the coil former 382a, 382b can penetrate without contact into the respective annular groove. The coil windings 383a, 383b are excited by an alternating voltage to generate air pulsations 5, so that the respective coil former 382a, 382b can oscillate in a frictionless manner in the respective annular groove.

In an especially advantageous embodiment, the housing 1 shown in the FIGURE and the exemplary oscillating diaphragm fan 3 are adapted to one another. Here, the actuator chambers 36a, 36b of the subunits 3a, 3b of the oscillating diaphragm fan 3 have no bottoms, so that the magnetic systems of the subunits 3a, 3b are then laid directly via their respective magnetic disk 381a, 381b onto the inside of the right vertical side wall 11. Here, the pot-shaped downwardly open sub-housings 31a, 31b are put in place via a respective margin located on the inside of the right side wall 11 of the housing, and are sealed off so as to be pressure-resistant. As a result, an embodiment is achieved in which a separate bottom is dispensed with, so that the construction heights of the sub-housings of the oscillating diaphragm fan 3 can be reduced. Providing such an arrangement is especially advantageous in installations into flat housings, for example, in stored program controls or notebook computers.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. An oscillating diaphragm fan comprising:
   a plurality of subunits, each of said plural subunits including an oscillating diaphragm which is excited by a magnetic system in an actuator chamber, air pulsation generated by the oscillating diaphragm being discharged outwardly from each of said plural subunits arranged in the same linear plane extending perpendicularly to a direction of the air pulsation;
   at least one pressure compensation duct which interconnects the actuator chamber of each of said plural subunits;
   wherein the actuator chamber is encapsulated outwardly and the magnetic system of each of said plural subunits is excited out of phase with each other.

2. The oscillating diaphragm fan as claimed in claim 1, wherein each of said plural subunits include a sub-housing which is divided by the oscillating diaphragm into a nozzle chamber and the actuator chamber, the air pulsation being discharged outwardly through the nozzle chamber.

3. A housing for receiving elements which discharge heat loss with an oscillating diaphragm fan as claimed in claim 1, wherein the actuator chambers of the subunits open in a direction disposed away from the at least one pressure compensation duct and are placed sealingly on an inside of a side wall of the housing for encapsulation.

4. The housing as claimed in claim 3, wherein the elements comprise electronic subassemblies.

5. The oscillating diaphragm fan as claimed in claim 1, wherein the plurality of subunits includes two groups, the magnetic systems of each of the two groups being configured such that they are activated oppositely to each other.

* * * * *